INVENTOR
ALFREDO M. OFFERMANN

United States Patent Office 2,869,359
Patented Jan. 20, 1959

2,869,359

INSTRUMENT FOR MEASURING THE MOISTURE AND TEMPERATURE OF SOIL

Alfredo M. Offermann, Buenos Aires, Argentina, assignor of one-half to Maura Luise Herzfeld, nee Dahlem, Washington, D. C.

Application August 18, 1953, Serial No. 375,022

5 Claims. (Cl. 73—73)

This invention relates to a measuring instrument for simultaneous control measurements of soil moisture and soil temperature being an electrical-resistance measuring instrument having a special compensation cell, and to the preparation of said compensation cell, said instrument permitting to exclude errors caused by differences in the salt concentration of different soils, for the measurement of whose humidity the instrument may be used, and changes in the temperature of the soil.

Hitherto known methods for measuring soil moisture have suffered from the disadvantage that serious errors occurred due to the changes in temperature as well as due to the differences in the concentration of salts in different soils which errors had to be corrected by the use of specially prepared tables for each kind of soil, which tables also contained the temperature correction values. The use of such tables required a certain training and abilities for calculations not always be found among farmers, planters etc.

Even the "plaster of Paris block method" described by G. J. B. Bouyoucos et al. (Agronomy Journal, vol. 42, No. 2, Feb. 1950, pages 104–107) does not prevent the occurrence of serious errors from the two aforesaid causes. The same is the case when other materials such as nylon, concrete, glass fiber, porcelain and the like are used instead of plaster of Paris.

The apparatus according to this invention avoids both sources of error by employing a specially prepared compensation cell included in, or connected to a known measuring cell block consisting of an absorption block of plaster of Paris or other suitable material of known composition.

The compensation cell according to this invention is arranged near the soil moisture measuring cell at the spot in the soil where the soil moisture and temperature are to be subject to current control measurements, either by embedding it within the same block of plaster of Paris or other suitable material, or near the same, thus suffering all variations in temperature affecting the measuring cell itself, when measuring the soil moisture.

The compensation cell is conveniently arranged in a measuring bridge circuit of the Wheatstone type using alternating electric current, or it may be connected to any other known measuring circuit of suitable kind such as a directly connected measuring circuit fed by alternating electric current.

The soil temperature is measured by the instrument according to this invention simultaneously and at the same spot where the soil moisture is being determined. This offers a special advantage for research work in agricultural problems concerning soil microbiology, and it is also of great importance in the fight against frost damages.

Another progressive feature of the invention lies in the fact that the nature and preparation of the compensation cell permits the determination of the range of the soil moisture measuring scale to be employed in the measuring instrument by prior adjustment to a particular soil having a given salt content, thus making the use of the given scale of the measuring instrument, once adjusted, independent of changes of range caused by differences in the salt contents of different soils. It is for instance possible to standardise the compensation cell so that the value of half the saturation moisture content is set at the central point of the indicator scale, or at any other desired point of the scale.

The elimination of errors due to the differences in salt contents of different soils, and the standardisation of the compensation to indicate the desired range on the scale of the measuring instrument employed is achieved by the following method of preparation for the compensation cell according to this invention:

Soil samples from the spot where a control measuring cell is to be located are saturated with moisture and their electrical conductivity value at saturation point is determined by one of the known methods, moisture is then reduced to half the saturation value, and again the conductivity value is determined, loss of moisture being controlled, for instance, by weighing. The determination of this conductivity value takes place at the standard temperature chosen. A salt solution having the same conductivity value is then prepared, the compensation cell is filled therewith, and the cell then hermetically closed.

The compensation cell according to this invention has thereby been adjusted to a resistance corresponding to the conductivity of the soil of the particular composition and from the particular region, for which the compensation cell is to be prepared.

The compensation cell thus prepared is then embedded in a block of plaster of Paris or other suitable known material together with the moisture measuring cell of known manufacture, or is buried in the soil close to said measuring cell, at the spot where the control measurements of soil moisture and temperature are to take place.

The instrument used to read the measurements obtained by aid of said moisture measuring cell and compensation cell block is provided with a reading scale adapted to the particular composition of the soil and on the basis of the saturation and half saturation values determined as previously described.

The half saturation value is set at a convenient point on the scale so as to allow for a wide distribution of values within the range desired. In the case of soil moisture measurements for agricultural purposes this will normally be the range between full saturation and the wilting point.

It is also possible to prepare a series of compensation cells for standard soils such as clay, loam, and the like, and to provide the measuring instrument with exchangeable reading scales, each reading scale corresponding to a standard-soil compensation cell.

While it is possible to arrange the temperature scale on the same dial with the soil moisture scale having them indicated at the same time with the same needle or the like, this is not recommended because the temperature range would be compressed on the scale due to the fact that temperature is not a linear function of the soil conductivity, thus impairing the reading efficiency of the instrument when using the temperature scale.

This difficulty has been overcome by using two indicating needles on two different scales. Temperature is read by means of the compensation cell alone, which thus serves in lieu of a resistance thermometer, thermistor or the like. In the preferred wiring diagram based on the method according to the invention temperature is measured by setting the indicator needle on the moisture measuring scale at the fixed point for moisture half-saturation value, then switching off the moisture measuring cell and measuring temperature on the special temperature measuring scale by means of the compensation cell alone, as is shown in the accompanying drawings.

In the drawings Figure 1 represents a schematic view of a preferred wiring diagram as used for the method of measuring soil moisture and soil temperature according to the invention.

Both circuits have in common the above-mentioned compensation cell. In the example both circuits are designed according to the Wheatstone bridge arrangement. Any other known system for measuring electrical resistances such as the alternate current ohmmeter are equally suitable. Any circuit improving the zero adjustment of the measuring instrument may be equally included in the wiring diagram.

Figure 1:
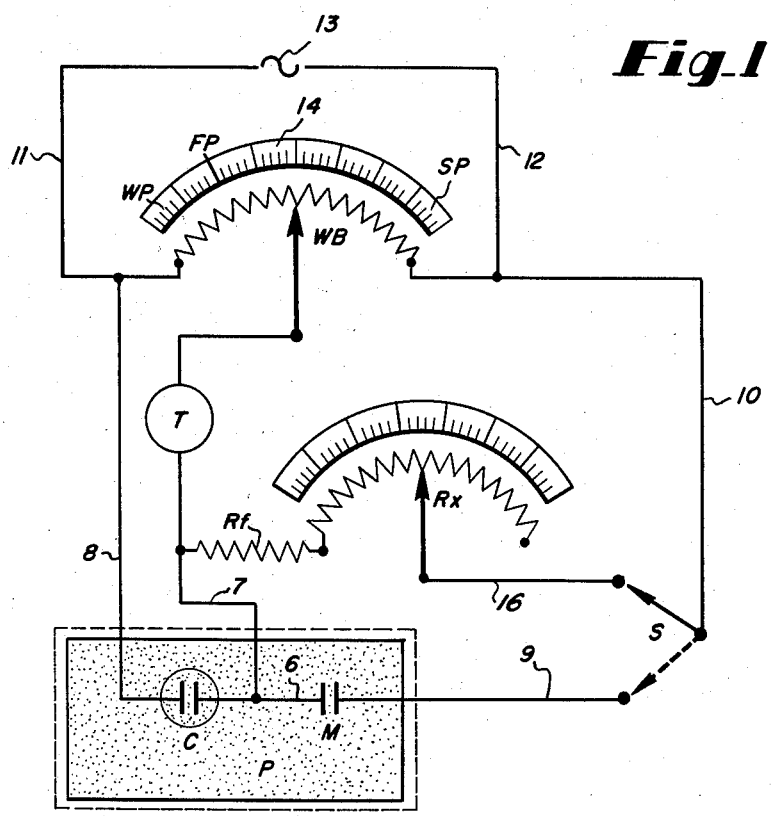
Figure 1 represents a wiring diagram by way of example showing the combination of two circuits, one for measuring soil moisture simultaneously eliminating salt and temperature errors, and the other for measuring soil temperature.

In the wiring diagram according to Figure 1 reference letter C indicates the compensation cell according to the invention, M the moisture measuring cell, which is preferably embedded together with C in a plaster of Paris block indicated by P. Reference mark WB refers to the soil moisture indicating device forming a Wheatstone bridge, Rx is a rheostat for zeroing the instrument when measuring temperature, Rf is a fixed resistance serving as a known basic resistance. Reference letter T indicates the telephone serving to find the zero point, and may be replaced by any known zeroing device. S refers to the switch for changing from the soil moisture measuring circuit to that for measuring temperature.

Figure 2:
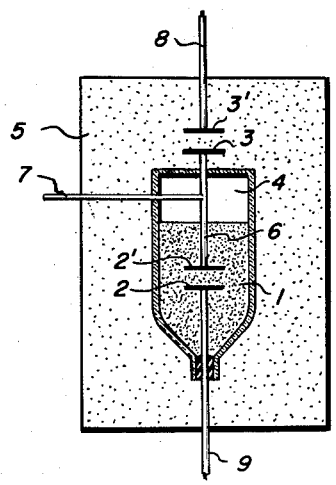
Figure 2 shows a sectional view of an embodiment of the compensation cell according to the invention.

In Figure 2 is shown a sectional view of the compensation cell according to the invention. Therein, reference numeral 1 refers to the compensation cell body made of glass or any other suitable material. Reference numerals 2, 2' indicate the electrodes of the compensation cell, 3, 3' the electrodes of the moisture measuring cell. It is preferable that all electrodes be made of the same material so as to avoid differences in potential.

An electrical lead 6 interconnects the compensation cell C and moisture measuring cell M which are located in the plaster block P. The lead 7 is connected to the lead 6 at a point between the compensation and moisture measuring cells and leads to a zeroing device T. A lead 8 extends from the compensation cell to one end of the soil moisture indicating device WB. Another lead 9 extends from the moisture measuring cell to a contact of the switch S. Finally, lead 10 connects switch S to the other end of the soil moisture indicating device WB. The latter is, at the same time, connected by leads 11 and 12 to a source of alternating electric current, 13.

The soil moisture indicating device WB comprises a scale 14 with a fixed point mark FP, a wilting point mark WP, and a saturation point mark SP. Lead 16 connects switch S to the temperature measuring rheostat Rx, whose one end is permanently connected via a fixed resistance Rf to the point intermediate cells C and M.

Reference number 4 indicates any known kind of device for closing the compensation cell hermetically after filling it, by way, of example, with plaster of Paris soaked with a standardized salt solution, up to the half-saturation value of conductivity. Reference number 5 indicates the plaster of Paris block wherein both the compensation cell are embedded. It is furthermore preferable to use the same material for filling the compensation cell and embedding the measuring cell in order to avoid errors caused by differences in potential between different materials.

When measuring temperature, the Wheatstone bridge potentiometer constituted by the soil moisture measuring device WB must be set to the mark FP on scale 14, which indicates the fixed point on the soil moisture scale that corresponds to the half-saturation value of the compensation cell at the standard temperature applied when preparing the cell.

The switch S is then turned to the temperature measuring circuit, shutting off the moisture measuring cell, and the rheostat Rx in the temperature measuring circuit is then adjusted to zero point by aid of the zeroing device T. Temperature may then be read on the rheostat scale.

The scope of the invention is indicated in the appended claims.

What I claim is:

1. In a soil testing apparatus; first and second moisture sensitive resistance cells connected in series with a first terminal leading to said first cell, a second terminal leading to said second cell, and a third terminal leading from between said cells, said first cell being sealed in an environment having a predetermined conductivity relative to the conductivity of the soil to be tested, a potentiometer having a movable tap and having one end connected to said first terminal, a switch having two contacts and an arm movable therebetween, said arm being connected to the other end of said potentiometer, one of said contacts being connected to said second terminal, a rheostat connected between the other of said contacts and said third terminal, and means for detecting the point of balance of the bridge connected between said third terminal and the said movable tap of said potentiometer.

2. An apparatus according to claim 1 in which the said cells are embedded in a porous block.

3. An apparatus according to claim 2 in which the potentiometer and rheostat are provided with calibrated scales.

4. An apparatus according to claim 3 in which the said calibrated scale of the potentiometer includes a guage-mark corresponding to the resistance of the said sealed first cell.

5. In a soil testing apparatus; first and second moisture sensitive resistance cells connected in series with a first terminal leading to said first cell, a second terminal, leading to said second cell, and a third terminal leading from between said cells, said first cell being sealed in an environment having a predetermined conductivity relative to the conductivity of the soil to be tested, a potentiometer having a movable tap and having one end connected to said first terminal, a rheostat connected with one side to said third terminal, switching means for connecting, at will, said second terminal selectively to the other end of said potentiometer, and to the other side of said rheostat; and means for detecting the point of balance of the bridge connected between said third terminal and said movable tap of said potentiometer.

References Cited in the file of this patent

UNITED STATES PATENTS

| 2,370,609 | Wilson et al. | Feb. 27, 1945 |
| 2,470,153 | Feller | May 17, 1949 |
| 2,526,636 | Colman | Oct. 24, 1950 |
| 2,547,625 | Corson | Apr. 3, 1951 |
| 2,636,962 | Bouyoucos | Apr. 28, 1953 |

FOREIGN PATENTS

| 533,381 | Great Britain | Feb. 12, 1941 |